INVENTOR.
JOHN F. CHARNEY
BY
ATTORNEY

United States Patent Office 3,457,558
Patented July 22, 1969

3,457,558
FAIL-SAFE CIRCUIT
John F. Charney, Sunland, Calif., assignor to Hughey & Phillips, Inc., a corporation of California
Filed Apr. 15, 1965, Ser. No. 448,366
Int. Cl. G08c 25/00
U.S. Cl. 340—213
14 Claims

ABSTRACT OF THE DISCLOSURE

An electrochemical circuit tis disclosed for automatically bypassing a defective circuit interrupter and continuously supplying power to a circuit load which is ordinarily intermittently operated. In addition, a remote indicator signals that there is a malfunction, and a circuit is opened to prevent recycling. Thus, in the case of an aircraft tower flashing beacon, when the flasher switch control circuit malfunctions in either the "ON" or "OFF" condition, the circuit will bypass the flasher switch and keep the beacon lit, while simultaneously signalling the malfunction at a remote indicator.

There are many types of circuits utilizing interrupters in the load circuit, such as aircraft tower lighting controls used to automatically flash beacons mounted on unattended microwave or other types of antenna structures. Such tower lighting controls utilize a photoelectric control circuit connected to a beacon flasher control, which is in turn coupled to the tower lights.

The photoelectric control circuit automatically turns off the tower lights during the daytime, or when the illumination rises above about 58 foot-candles. When darkness falls, or when the illumination decreases to about 35 foot-candles, the photoelectric control circuit automatically turns on the tower lights. A time delay of several seconds is usually incorporated in order to prevent the tower lights from being turned off by transient light flashes.

The beacon flasher control circuit causes the tower lights to flash on and off when the photoelectric control circuit has the tower lights in the "ON" condition.

It is readily apparent that if a failure should occur in the described control circuits, causing the tower lights to be off while it is dark, serious accidents can occur. It is possible, for example, for an aircraft to collide with unlit tall obstacles.

It is an object of the present invention, therefore, to provide a novel fail-safe circuit.

It is another object of the present invention to provide a fail-safe circuit which will turn a lamp load on when a control circuit fails to flash the lamp load on and off as intended.

It is still another object of the present invention to provide a fail-safe circuit which will turn a lamp load on and keep it on when a flasher control circuit fails in either the "ON" or "OFF" condition.

It is yet another object of the present invention to provide a fail-safe circuit which will activate an alarm or warning device when the lamp load fails to flash on and off as intended.

According to one embodiment of the present invention, a fail-safe circuit comprises three time-delay relays coupled to the lamp load and flasher control circuit. Two of the relays have comparatively short time delays and have normally closed contacts. The third relay has a comparatively long time delay and has normally open contacts.

When the circuit is operating normally, the contacts of the first two relays are held in the open condition, and the contacts of the third relay are held in the closed condition. If the flasher circuit should fail in either the "ON" or "OFF" condition, the contacts of one of the first two relays will close, and current through the third relay will then be able to activate a fourth relay which will keep the lamp load turned on continuously. A fifth relay will also be activated so as to turn on a remote indicator to notify someone that there has been a failure.

The features of the present invention which are believed to be novel are set forth with particularity in the appended claims. The present invention, both as to its organization and manner of operation, together with further objects and advantages thereof, may be best understood by reference to the following description, taken in connection with the accompanying drawings, in which:

Figure 1:
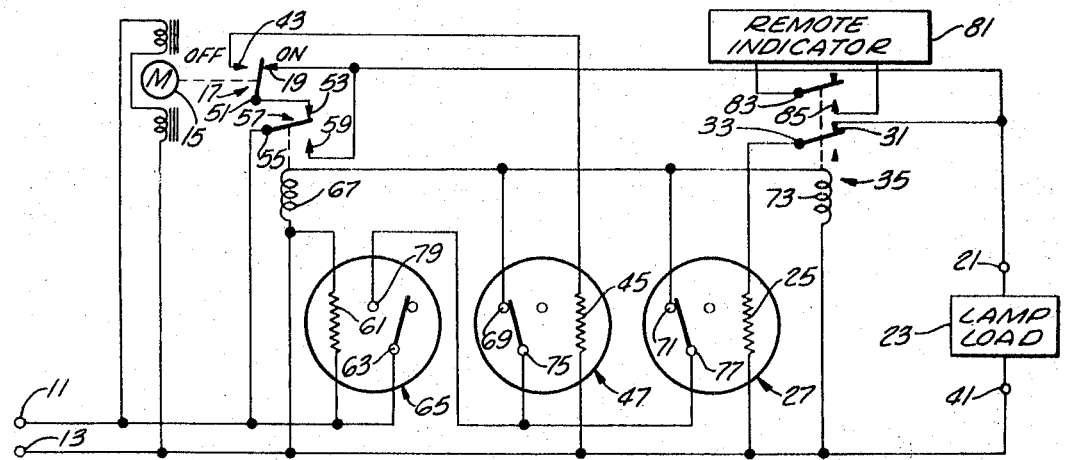
FIGURE 1 is a schematic diagram of a fail-safe circuit according to the present invention, with no current applied.

Turning now to the drawings, FIGURE 1 shows input terminals 11 and 13 connected to 30 r.p.m. gear reduction motor 15. Single pole double throw (SPDT) mercury tilt-switch 17 is operated by a cam attached to the shaft of motor 15 in such a manner as to cause the lamp load to be flashed on and off alternately "ON" contact 19 of switch 17 is connected to terminal 21 of lamp load 23, and to heating element 25 of thermal time delay relay 27 through contact 31 and terminal 33 of double throw (DPDT) control relay 35. The other end of heating element 25 is connected to input terminal 13, as is terminal 41 of lamp load 23.

"OFF" contact 43 of switch 17 is connected to one end of heating element 45 of thermal time delay relay 47, the other end of heating element 45 being connected to input terminal 13. Terminal 51 of switch 17 is connected to input terminal 11 through contact 53 and terminal 55 of SPDT power relay 57. Contact 59 of relay 57 is connected to "ON" terminal 19 of switch 17.

Input terminal 11 is connected to heating element 61 and terminal 63 of thermal time delay relay 65. The other end of heating element 61 is connected to input terminal 13. One end of coil 67 is connected to contact 69 of relay 47, contact 71 of relay 27 and to one end of coil 73 of relay 35. The other ends of coils 67 and 73 are connected to terminal 13. Terminal 75 of relay 47 and terminal 77 of relay 27 are connected together and to contact 79 of relay 65.

Remote indicator 81 is connected across terminal 83 and contact 85 of relay 35. The operation of the fail-safe circuit will now be described.

FIGURE 1 shows relays 27, 35, 47, 57 and 65 in their normal conditions before any input voltage is applied to terminals 11 and 13. Thus, it can be seen that the contacts of relays 27 and 47 are normally closed, while the contacts of relay 65 are normally open. The current path through terminal 33 and contact 31 is normally closed, and the current path through terminal 83 and contact 85 is normally open. Terminal 55 and contact 53 of relay 57 are normally closed.

When an alternating current (AC) is aplied to input terminals 11 and 13, motor 15 is activated so as to electrically connect terminal 51 alternately with "ON" terminal 19 and "OFF" terminal 43, thereby flashing lamp load 23 on and off at a predetermined rate. During the "ON" condition or stage sufficient power is supplied to heating element 25 of thermal time delay relay 27 to cause it to open its contacts and to hold them open even during the "OFF" cycle. During the "OFF" condition or stage sufficient power is supplied to heating element 45 of thermal time delay relay 47 to open its contacts and to hold them open during the "ON" stage.

Thermal time delay relay 65 is used to delay application of power to coil 67 of power relay 57 and to coil 73 of control relay 35 through the normally closed contacts of thermal relays 27 and 47 until they have opened. Relay 65 has a time delay which is sufficiently long enough to allow the normally closed contacts of thermal relays 27 and 47 to open before the contacts of thermal relay 65 close. A 60-second delay for relay 65 and a 5-second delay for each of relays 27 and 47 have been found to be satisfactory.

Figure 2:
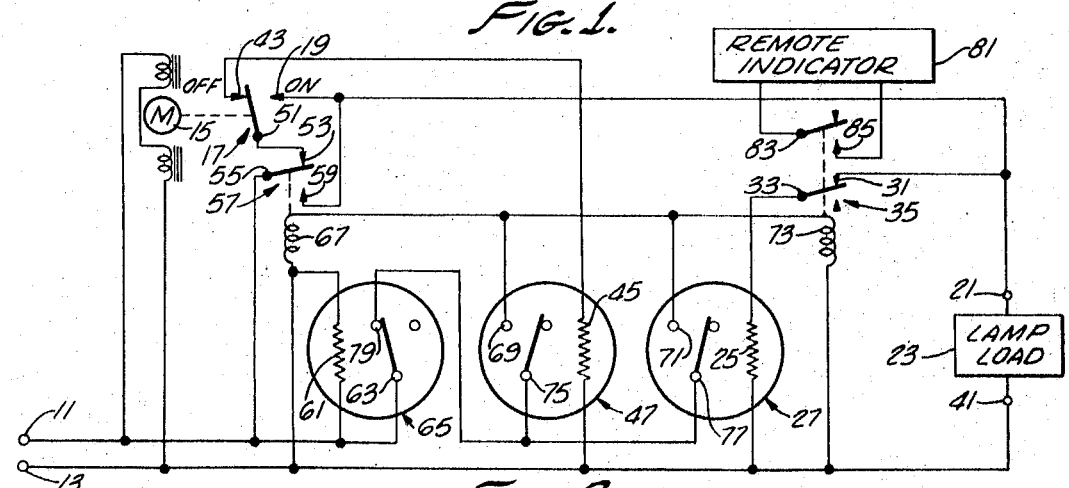
FIGURE 2 is a schematic diagram showing the changes that will occur in the relays in FIGURE 1 when current is applied thereto.

FIGURE 2 shows the condition of the circuit described in FIGURE 1 at this point, with a 115 volt AC input voltage applied to terminals 11 and 13. Thus, during both the "ON" and "OFF" stages, the contacts of relay 65 are held closed, and the contacts of relays 27 and 47 are held open.

If switch 17 should fail to make contact in its "ON" condition or if motor 15 should stop or fail to start with switch 17 in its "OFF" condition, power will be removed from heating element 25 of relay 27, causing its normally closed contacts to close, thereby energizing fail-safe relay 57. This opens the circuit between terminal 55 and contact 53, and closes the circuit between terminal 55 and contact 59, thereby bypassing open switch 17 and supplying power to and turning lamp load 23 on continuously. Control relay 35 is simultaneously energized, closing the circuit between terminal 83 and contact 85, so as to provide means for a remote signal to indicate a malfunction of the flashing mechanism or circuit. In addition, the circuit between terminal 33 and contact 31 is opened, to prevent recycling.

If switch 17 should fail to make contact in its "OFF" condition, or if motor 15 should stop or fail to start with switch 17 in its "ON" condition, power will be removed from heating element 45 of relay 47, causing its normally closed contacts to close, thereby energizing fail-safe relay 57 so as to open the circuit between terminal 55 and contact 53, and to close the circuit between terminal 55 and contact 59. As a result, switch 17 is bypassed and power is supplied directly to lamp load 23 continuously. Simultaneously, as already described, control relay 35 is energized, thereby activating remote indicator 81 to signal a malfunction of the flashing mechanism or circuit, and also opening the circuit to heating element 25, to prevent recycling.

The described circuit will provide a single signal to indicate that a malfunction of the flasher circuit has occurred and that the fail-safe circuit has operated. In some applications two separate signals may be desired, the first signal to indicate that the malfunction caused the lamp load to be turned off and that the fail-safe circuit operated to turn the lamps on continuously, and the second signal to indicate that the malfunction failed to turn the lamp load off. This may be accomplished by using the normally closed contacts of thermal time delay relay 47 to provide the second signal instead of energizing fail-safe relay 57 and control relay 35 of FIGURES 1 and 2.

If desired, a small control relay can be energized via the contacts of thermal relay 65, with the normally open contacts of the small control relay connected in series with the normally closed contacts of thermal relay 47, in order to prevent a malfunction signal from occurring during the time initially required for the contacts of thermal relay 47 to open.

Although switch 17 is shown as a single pole double throw (SPDT) switch, it should be apparent that it could easily be replaced by two single pole single throw (SPST) switches or any similar arrangement. In addition, the circuit through terminal 51 and contact 43 of switch 17 could be used to energize a dummy load to balance the line load when the flashing lamp load is in the "OFF" condition.

Relays 27, 47 and 65 have been described as thermal time delay relays, but it is to be understood that they could also be other types, such as magnetic, pneumatic, motor driven or solid state relays, by way of example only.

Figure 3:
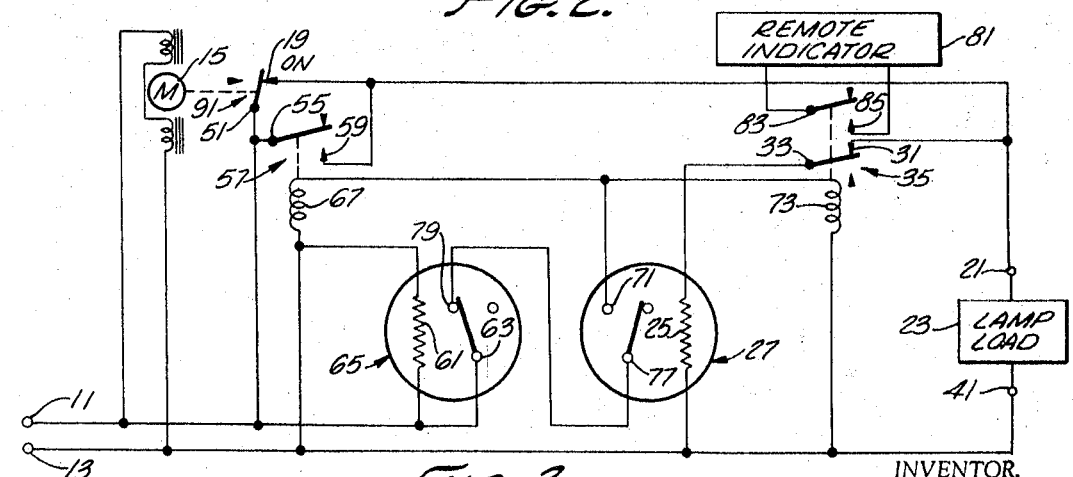
FIGURE 3 is a schematic diagram of different embodiment of one portion of the circuit shown in FIGURES 1 and 2.

FIGURE 3 shows how the circuit may also be used with SPDT switch 17 replaced by SPST switch 91, in which case thermal time delay relay 47 is not required. Thus, in FIGURE 3, neither "OFF" contact 43 of relay 17, nor contact 53 of relay 57 is connected in the circuit, and relay 47 is entirely omitted. As a consequence, however, although the circuit will detect a continuously open switch or "OFF" condition, it will not detect a continuously "ON" condition. Upon detection of a continuously open switch, the circuit would both turn the lamp load on continuously and activate the remote indicator to notify someone of the existence of the malfunction.

There has thus been described a fail-safe circuit for a flashing lamp load, which is activated by an electromagnetically driven device. The present invention is intended to cover any type of device in which the power to the load is periodically interrupted and in which the described circuit is used to provide fail-safe operation. In addition, the circuit provides indication of a malfunction in the normal operation of the circuit interrupter, which malfunction intially activated the fail-safe circuit.

The described circuit provides means for bypassing the flashing mechanism in order to turn the lamp load on continuously in the event of one of the following malfunctions of the flashing mechanism: an open switch in either the "ON" or "OFF" condition, or the motor stopping or failing to start with the switch in either the "ON" or "OFF" condition.

While particular embodiments of the present invention have been shown and described, it will be obvious to those skilled in the art that changes and modifications may be made without departing from this invention in its broader aspects, and, therefore, the aim in the appended claims is to cover all such changes and modifications which fall within the true spirit and scope of this invention.

I claim:
1. A fail-safe circuit for intermittently operated loads, comprising:
   (a) circuit interrupter means for periodically interrupting power to the circuit load, and
   (b) relay means coupled to said interrupter means, said relay means causing power to be continuously supplied to said load in the event said interrupter means interrupts power to said load for a period greater than desired.

2. A fail-safe circuit for intermittently operated loads, comprising:
   (a) circuit interrupter means for periodically interrupting power to the circuit load, and
   (b) relay means coupled to said interrupter means, said relay means presenting an open circuit to said load so long as said interrupter means continues to periodically interrupt power to said load, and said relay means permitting power to be continuously supplied to said load and bypassing said interrupter means when said interrupter means interrupts power to said load for a period greater than desired.

3. A fail-safe circuit for intermittently operated loads, comprising:
   (a) circuit interrupter means for periodically interrupting power to the circuit load,
   (b) relay means coupled to said interrupter means, said relay means presenting an open circuit to said load so long as said interrupter means continues to periodically interrupt power to said load, and said relay means permitting power to be supplied to said load continuously and bypassing said interrupter means when said interrupter means interrupts power to said load for a period greater than desired, and
   (c) indicator means coupled to said relay means for indicating whether or not said relay means is bypassing said interrupter means.

4. A fail-safe circuit for intermittently operated loads, comprising:
   (a) circuit interrupter means for periodically interrupting power to the circuit load,
   (b) a first time delay relay having normally open contacts coupled to a second time delay relay having normally closed contacts, said first relay having a longer time delay than said second relay, said relays being coupled to said interrupter means and presenting an open circuit to said load so long as said interrupter means continues to periodically interrupt power to said load, and said relays permitting power to be continuously supplied to said load and bypassing said interrupter means when said interrupter means interrupts power to said load for a longer time than desired, and
   (c) indicator means coupled to said relay means for indicating whether or not said relay means is bypassing said interrupter means.

5. A fail-safe circuit for intermittently operated loads comprising:
   (a) circuit interrupter means for periodically interrupting power to the circuit load, said means having first and second conditions and permitting power to be supplied to said load when in its first condition,
   (b) a first time delay relay having normally open contact which, after an initial time delay, are maintained in their closed condition so long as power is supplied to said fail-safe circuit,
   (c) a second time delay relay having normally closed contacts and a time delay element, said first relay having a longer time delay than said second relay, said contacts of said relays being coupled together and to a third relay, said element of said second relay being coupled to said circuit interrupter means and holding the contacts of said second relay open so long as said circuit interrupter means continues to periodically interrupt power to said load, said contacts of said second relay closing when said interrupter means fails to enter its first condition for a period greater than a predetermined time interval, thereby activating said third relay whtich causes said circuit interrupter means to be bypassed and permits power to be continuously supplied to said load.

6. Apparatus as defined in claim 5 including, in addition, indicator means coupled to said relays for indicating whether or not said third relay has been activated.

7. Apparatus as defined in claim 6 including additional relay means coupled to said second relay, said additional relay means disconnecting said element of said second relay when said third relay is activated, thereby preventing recycling.

8. Apparatus as defined in claim 5 including an additional time delay relay having normally closed contacts and a time delay element, said first relay having a longer time delay than said additional relay, said contacts of said additional relay being coupled to said third relay and said element of said additional relay being couple to said circut interrupter means and holding the contacts of said additional relay open so long as said circuit interrupter means continues to periodically interrupt power to said load, said contacts of said additional relay closing when said interrupter means remains in its first condition for a period greater than a predetermined time interval, thereby activating said third relay which causes said circuit interrupter means to be bypassed and permits power to be supplied directly to said load.

9. Apparatus as defined in claim 8 including, in addition, remote indicator means coupled to said relays for indicating that said circuit interrupter means is no longer periodically interrupting the power supplied to said load.

10. A fail-safe circuit for intermittently operated loads comprising:
   (a) switch means for periodically interrupting power to the circuit load, said switch means having "ON" and "OFF" positions and permitting power to be supplied to said load when in its "ON" position,
   (b) a first time delay relay having normally open contacts which, after an initial time delay, are maintained in their closed condition so long as power is supplied to said fail-safe circuit,
   (c) a second time delay relay having normally closed contacts, a time delay element and a shorter time delay than that of said first relay, said contacts of said second relay being coupled to a third relay and electrically in series with said contacts of said first relay, said element of said second relay being coupled to the "ON" position of said switch means and holding said contacts of said second relay open so long as said switch means continues to periodically interrupt the power to said load, said contacts of said second relay closing when said switch means fails for a period greater than a predetermined time interval to enter into its "ON" position, thereby activating said third relay which causes said switch means to be bypassed and permits power to be continuously supplied to said load.

11. A fail-safe circuit for a lamp load, comprising:
   (a) switch means for periodically interrupting power to said load, said switch means having "ON" and "OFF" positions and permitting power to be supplied to said load when in its "ON" position,
   (b) a first time delay relay having normally open contacts which, after an initial time delay, are maintained in their closed condition so long as power is supplied to said fail-safe circuit,
   (c) second and third time delay relays, each having normally closed contacts, a time delay element and a shorter time delay than that of said first relay, said contacts of said second and third relays being coupled to a fourth relay and electrically in parallel with each other and in series with said contacts of said first relay, said elements of said second and third relays being coupled to the "ON" and "OFF" positions of said switch means, respectively, said elements holding their respective contacts open so long as said switch means continues to periodically interrupt the power to said load, said contacts of said second relay closing when said switch means fails for a period greater than a predetermined time interval to enter into its "ON" position, thereby activating said fourth relay, said contacts of said third relay closing when said switch means remains in its "ON" position for a period greater than a predetermined time interval, thereby activating said fourth relay, and said fourth relay, when activated, closing a circuit which bypasses said switch means and permits power to be continuously supplied to said load.

12. Apparatus as defined in claim 11 including, in addition, fifth relay means coupled to said second relay, said fifth relay means disconnecting said element of said second relay when said fourth relay is activated, thereby preventing recycling.

13. Apparatus as defined in claim 12 including, in addition, remote indicator means coupled to said relays for indicating whether or not said fourth relay has been activated.

14. Apparatus as defined in claim 13 in which said second and third relays are thermal time delay relays and in which said time delay elements are heating elements.

References Cited

UNITED STATES PATENTS

| 2,113,273 | 5/1938 | Leach | 340—331 |
| 2,783,458 | 2/1957 | Hammer | 340—248 |
| 3,336,574 | 8/1967 | Selzer | 340—331 |

THOMAS B. HABECKER, Primary Examiner

U.S. Cl. X.R.

307—132; 340—222, 342